June 28, 1955  D. P. DAVIS  2,711,802
FLUID COOLED BRAKE

Filed June 4, 1951  2 Sheets-Sheet 1

INVENTOR.
Douglas P. Davis.
BY
Wilfred E. Lawson
ATTORNEY.

June 28, 1955 D. P. DAVIS 2,711,802
FLUID COOLED BRAKE
Filed June 4, 1951 2 Sheets-Sheet 2

INVENTOR.
Douglas P. Davis.
BY Wilfred E. Lawson
ATTORNEY.

United States Patent Office 2,711,802
Patented June 28, 1955

2,711,802

FLUID COOLED BRAKE

Douglas P. Davis, Burbank, Calif.

Application June 4, 1951, Serial No. 229,787

4 Claims. (Cl. 188—264)

This invention relates generally to the class of brakes and is directed particularly to cooling or heat reducing means associated with the same.

A principal object of the present invention is to provide an improved brake structure designed for use in association with any type of rotating shaft or other rotating machinery, wherein means is provided for carrying off heat generated by friction so that the braking apparatus can be used continuously over a long period of time without becoming heated.

A further and more specific object of the invention is to provide an improved brake mechanism comprising a rotatable member connected with the machine whose rotary motion is to be checked, in association with friction means adapted to be applied to the rotary member and means for bathing the contacting parts in a circulating liquid which functions to carry off heat developed by friction.

Still another object of the invention is to provide a liquid cooled brake comprising a closed housing in which is a rotary member connected with the machine whose rotary motion is to be controlled, together with means for keeping the housing filled with a constantly changing cooling liquid and pressure actuated means for applying friction to a surface of the rotating member to retard or stop such rotation.

Still another object of the invention is to provide in a braking mechanism of the above described character, fluid pressure actuated pistons which are forced into frictional contact with the rotary member from opposite sides thereof whereby equal and opposing forces can be applied to obtain the desired braking action.

A still further and still more specific object of the invention is to provide in a braking mechanism of the character stated employing a rotatable element, a means for applying under fluid pressure friction elements to opposite sides of the rotatable member wherein said elements are coupled together across the periphery of the rotatable member and one only thereof is forced by fluid pressure into contact with the rotatable member causing by reacting force the shifting of the coupling to bring the other friction element into opposing contact with the rotatable member.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

Figure 1:
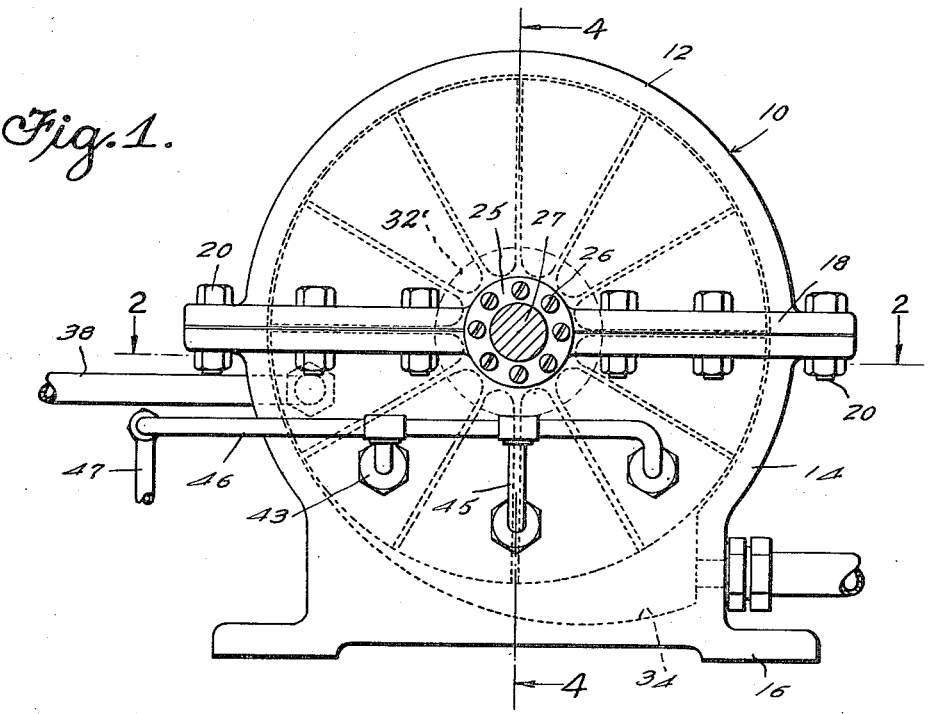
Figure 1 is a view in side elevation of a liquid cooled brake mechanism constructed in accordance with one embodiment of the present invention.

Referring now more particularly to the drawings the numeral 10 generally designates a circular housing comprising the top section 12 and the bottom section 14, the latter section being preferably constructed integral with a supporting base 16 as shown.

The sections 12 and 14 have opposing coupling flanges 18 which are secured together by bolts 20 and at the radial centers of the sections are the complementary semi-circular recesses 22 which together form an opening to receive a shaft bearing 24. The bearings 24 are secured in place by any suitable means as, for example, by the ring plates 25 which are secured by screws 26 tapped into the adjacent housing sections.

Extending through the bearings 24 is a shaft 27 which is the rotary member to which braking force is to be applied and within the circular housing the shaft 27 has mounted thereon an impeller which is generally designated 28. The impeller comprises a hub 29 through which the shaft 27 passes and to which the shaft is secured in any approved manner as by means of a key 30.

The impeller 28 is of the enclosed type in that it comprises a plurality of radial vanes 31 which are covered or shrouded on both sides by the flat circular plates 32, thereby forming a plurality of V-shaped pockets 33 which open radially or toward the outer circular wall of the housing. The ends of the vanes 31 are in relatively close proximity to the inner circular wall of the housing except for a short circumferential extent in the bottom of the housing where the base portion 16 is provided with the trough 34 which gradually increases in depth from one end to the other through a portion of the circumferential extent of the impeller and at the deepest end of the trough 34 there is connected in the threaded opening 35 formed in the wall of the lower portion 14 of the housing, an outlet pipe 36 for the cooling fluid with which the housing is filled.

One side wall of the housing lower portion 14 has a threaded opening 37 therein, in which is connected an end of a fluid supply pipe 38.

Figure 3:
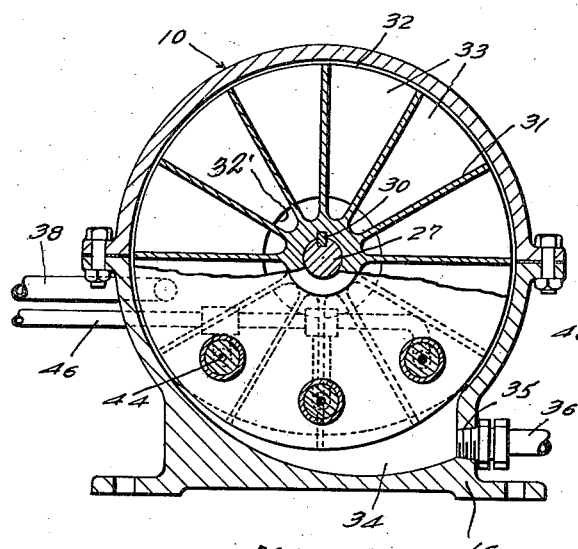
Figure 3 is a sectional view taken in a vertical plane substantially on the line 3—3 of Figure 2, and showing a portion of the impeller structure in section.
Figure 4:
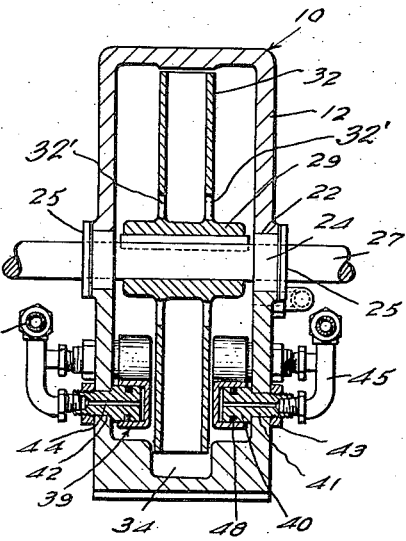
Figure 4 is a sectional view taken in a vertical plane through the radial center of the mechanism substantially on the line 4—4 of Figure 1.

The rotation of the impeller, as it is viewed in Figures 1 and 3, is counterclockwise so that the action of the vanes is to move the fluid with which the housing is filled, toward the deep end of the trough 34 and to the outlet pipe 36. The circular plates 32 at the inner ends of the pockets 33 have the openings 32' therein. Accordingly, the cooling liquid, preferably water will be moved radially through the pockets and will also be impelled in the housing to the outlet pipe 36.

In the form of the invention illustrated in Figures 1 to 4 there are provided in the lower section 14 of the housing and at each side of the impeller, a number of fluid pressure actuated friction units, each of which is generally designated 39. There are here shown three of these units on each side of the housing for frictional engagement with a side of the impeller, the units on one side of the impeller being in alignment with units on the opposite side so that opposing braking forces may be applied to the impeller.

Each of the friction units 39 comprises a circular body 40 which is positioned against the inner wall of the housing with an end in opposed spaced relation with a side or disk 32 of the impeller, the axis of the body being parallel with the rotary axis of the impeller. The opposite end of the body has a reduced shank 41 which extends through a suitable opening 42 in the housing wall and is threaded on its outer end to receive the securing nut 43.

Figure 2:
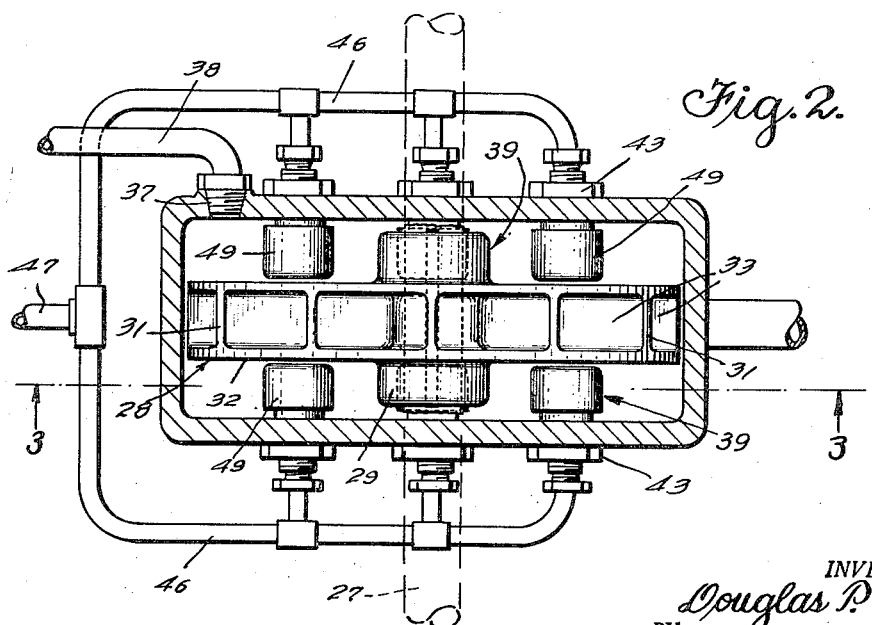
Figure 2 is a horizontal section through the housing only, taken substantially on the line 2—2 of Figure 1, parts inside the housing being in top plan.

Each of the bodies 40 has an axial fluid passage 44 therethrough and threaded into an enlarged outer end portion of this passage is an end of a pipe 45 which leads from and forms a branch of a manifold 46. The manifolds on the two sides of the machine are preferably connected with a single supply pipe 47 as shown in Figure 2 although, of course, this arrangement is not necessary to the proper functioning of the machine.

Each body 40 has fitted in a circumferential channel in its wall, a packing ring 48 and slidably positioned upon each body and snugly engaging the packing ring 48 is a free floating cup piston 49 constituting a friction element or brake shoe. As is readily apparent upon reference to Figure 4 this cup piston has its skirt portion in close contact or engagement with the body 40 and the packing ring 48 while the closed end of the cup covers the inner end of the body and is opposed to the adjacent plate of the impeller. It will thus be seen that when fluid under pressure is forced through the pipe 45 into the passage 44 of the attached body, the free floating friction element or piston 49 will be forced to slide inwardly on the body until its closed end comes into contact with the adjacent plate 32 forming a side of the impeller. Thus frictional engagement will be made with the impeller and the amount of pressure applied to the friction element or piston will determine the degree of braking resulting.

By reason of the disposition of the friction units on opposite sides of the housing or on opposite sides of the impeller with each unit in axial alignment with a unit on the other side of the impeller, it will be seen that when the fluid pressure is applied to the free floating pistons or friction members the pressure applied to the impeller will be equalized on the two sides thereof.

Figure 5:
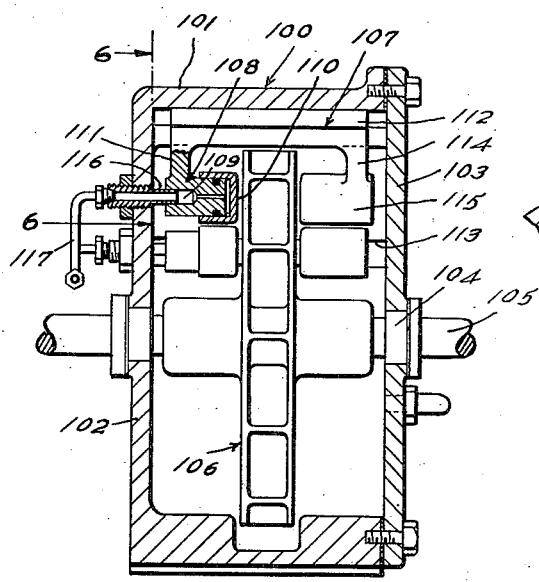
Figure 5 is a detailed sectional view corresponding to Figure 4 but showing another embodiment of the friction applying elements.
Figure 6:
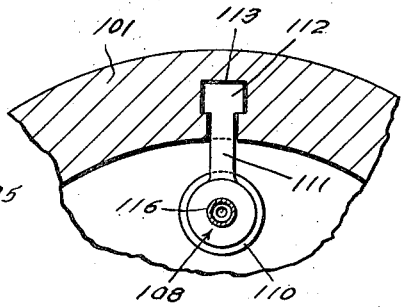
Figure 6 is a partial section taken substantially on the line 6—6 of Figure 5.

In Figures 5 and 6 there is shown a modified construction wherein, in addition to having a slightly differently constructed housing, another means is disclosed for applying equal pressure to the opposite sides of the impeller by the use of a free floating piston or friction member on one side only of the impeller.

In the modified construction shown the housing is generally designated 100 and comprises a substantially circular box 101 having the integral wall 102 on one side and the removable wall plate 103 on the opposite side. The walls 102 and plate 103 have opposite bearings 104 therein through which extends the shaft 105, corresponding to the shaft 27 hereinbefore referred to.

The impeller unit is generally designated 106. Since this unit is a duplicate of the unit 28 previously referred to it is not believed necessary to describe the same in detail as the details of construction for the unit 28 apply to the unit 106.

In accordance with the modified construction there are employed one or more axially shiftable friction applying units which are designated generally 107. Each of these units 107 comprises a circular body 108 corresponding to the body 40 and having an axial fluid passage 109 therethrough and an axially shiftable free floating piston cup 110 on its inner end. This body 108 is connected by an arm 111 with an end of a shift bar 112 which, as shown in Figure 6, is of T form and is mounted for sliding movement along a path paralleling the rotary axis of the impeller 106, in a T slot 113 formed across the inner side of the circular wall of the housing. The shift bar extends across the periphery of the impeller as shown in Figure 5 and at the end remote from the radial arm 111 it is connected with the radial arm 114, on the inner end of which is carried a friction shoe 115. This friction shoe is of circular form and is positioned to be in axial alignment with the body 108 as illustrated.

The end of the body 108 remote from the impeller has the bore 109 enlarged to receive the inner end of a fluid injector nozzle 116 which extends through and is threaded in an opening in the wall 102.

The outer end of the fluid injector nozzle 116 is connected with a pipe 117 through which fluid from a suitable pressure source is conveyed to effect the movement of the unit 107.

It will be readily apparent that when fluid under pressure is injected into the passage 109 of the piston carrying body 108, the friction member or piston 110 will be forced inwardly against the adjacent side of the impeller and the reacting force will then effect the shifting of the bar 112 in the opposite direction from the movement of the element 110 so as to bring the friction shoe 115 into engagement with the opposite side of the impeller. In this manner the desired opposing friction forces will be applied to the two sides of the impeller in the same manner as in the operation of the friction units 39.

Since in both cases the elements contacting the opposite sides of the impellers are attached to and carried by the housings the pressure applied to the impeller will have a retarding or braking effect upon its rotary motion.

The braking effect of pressure applied to the sides of the impeller will produce heat. It is one of the principal features of this invention to remove this generated heat, no matter how long a time the braking action is imposed. The entire housing is filled with a cooling liquid which cools the friction elements 49, 110 and 115 and since this liquid is being circulated in the housing and is constantly being drawn off and new cool liquid being supplied it will be seen that the liquid cannot heat up and the entire apparatus will be maintained at a proper workable temperature.

I claim:

1. A brake mechanism comprising a rotatable body, a circular element secured centrally thereon to turn therewith, said element being of substantial thickness and having opposite flat faces, a fluid tight housing enclosing the element, means for introducing a heat absorbing fluid into and removing it from the housing, the housing being filled with the fluid and the circular element having a plurality of fluid conducting passageways radially therein and opening at the inner ends through a flat face and opening at the outer ends through the periphery of the element, a pair of hollow cylindrical braking elements each having a closed end adapted to have frictional contact with a flat face of the circular element, a pair of elongate bodies rigidly supported in the housing upon opposite sides of said circular element and each inserted into a hollow braking element through the other end of the latter, each hollow cylindrical braking element having reciprocal movement on its supporting body relative to the said flat faces, and means for effecting the concerted movement of the braking elements on their supporting bodies into and out of engagement with said faces.

2. A brake mechanism comprising a rotatable body, a circular element secured thereto to turn therewith; said element having opposed surfaces disposed in spaced parallel planes normal to the axis of rotation of said body and said element, a housing enclosing said element and affording bearing support for said body, braking means carried by said housing comprising a fluid pressure actuated piston means engaging one of said surfaces on said element and other fluid pressure actuated means simultaneously engaging the other of said surfaces, means for supplying fluid pressure to said piston means and said other fluid pressure actuated means with resultant application of braking force to said element; said housing including a circular wall portion closely spaced from and extending parallel to the periphery of said element for a major portion of its circumference and a shorter, trough-like portion gradually increasing in radial distance from the axis of rotation of said element in the direction of rotation thereof, a fluid inlet extending into said housing at a point remote from said trough-like portion, and a fluid outlet extending from the interior of said housing to the exterior thereof in said trough-like portion; the relation between and configuration of the periphery of said element and said wall of said housing additionally constituting a pump means effective upon rotation of said element to draw heat absorbing fluid into said housing through said inlet and discharge fluid therefrom through said outlet.

3. A brake mechanism comprising a rotatable body, a circular element secured thereto to turn therewith; said element having opposed surfaces disposed in spaced parallel planes normal to the axis of rotation of said body and said element, a housing enclosing said element and affording bearing support for said body, braking means carried by said housing comprising a pair of reciprocable, fluid pressure actuated pistons; one each of said pistons engaging each of said surfaces on said element, means for simultaneously applying fluid pressure to said pistons with resultant application of braking force to said element by said pistons; said housing including a circular wall portion closely spaced from and extending parallel to the periphery of said element for a major portion of its circumference, and a shorter, trough-like portion gradually increasing in radial distance from the axis of rotation of said element in the direction of rotation thereof, a fluid inlet extending into said housing at a point remote from said trough-like portion, and a fluid outlet extending from the interior of said housing to the exterior thereof in said trough-like portion; the relation between and the configuration of the periphery of said element and said wall of said housing additionally constituting a pump means effective upon rotation of said element to draw heat absorbing fluid into said housing through said inlet and discharge fluid therefrom through said outlet.

4. A brake mechanism as claimed in claim 2 in which said piston means includes a piston supporting member non-rotatably mounted on said housing and including a piston-supporting free end of circular cross section disposed adjacent to one side of said circular member with its axis disposed parallel to and laterally offset from the axis of rotation of said circular member, a cup piston slidably mounted on said free end and including a head portion adapted to frictionally engage said one side of said circular element, and fluid conduit means extending from the exterior of said housing through said piston supporting member effective to conduct fluid under pressure to the interior of said piston with resultant movement of said piston axially of said free end of said piston supporting member into braking engagement with said one side of said circular member.

References Cited in the file of this patent

UNITED STATES PATENTS

| | | |
|---|---|---|
| 854,720 | Dawson | May 28, 1907 |
| 1,875,095 | Milan | Aug. 30, 1932 |
| 2,105,867 | Stewart | Jan. 18, 1938 |
| 2,399,010 | Eksergian et al. | Apr. 23, 1946 |
| 2,400,225 | Eksergian | May 14, 1946 |
| 2,407,699 | Hill | Sept. 17, 1946 |
| 2,417,156 | Dickson | Mar. 11, 1947 |
| 2,517,973 | Cardwell et al. | Aug. 8, 1950 |

FOREIGN PATENTS

| | | |
|---|---|---|
| 243,557 | Germany | Feb. 16, 1912 |
| 514,638 | France | Nov. 17, 1920 |